A. G. MACDONALD.
MOTOR CAR BODY.
APPLICATION FILED JUNE 3, 1913.
1,147,333.
Patented July 20, 1915.
4 SHEETS—SHEET 1.
Fig. 1.
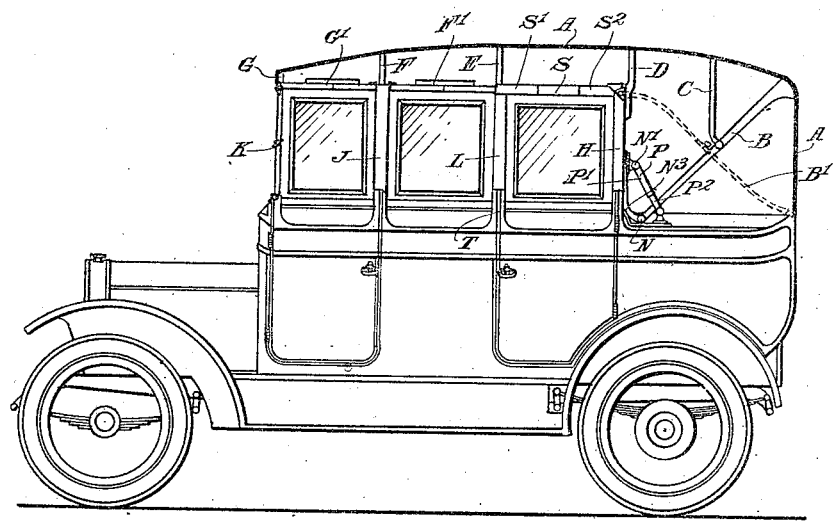
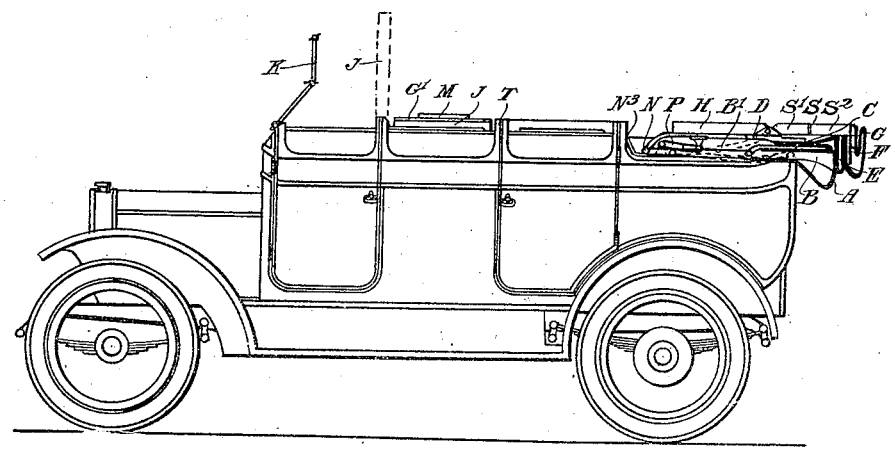
Fig. 2.
Witnesses:
H. N. Ramsey
C. A. Kring
Inventor:
Alexander Godfrey Macdonald,
by Bacon & Milans
Attys.

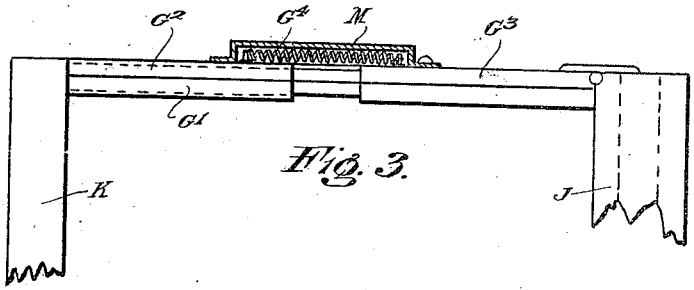
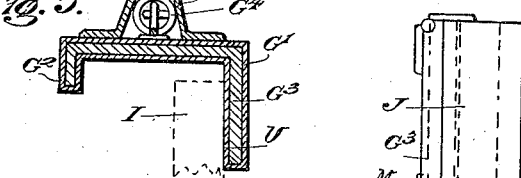
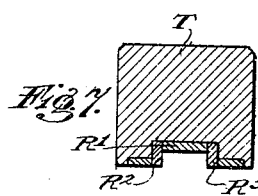
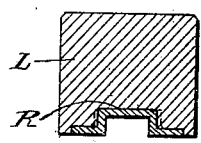
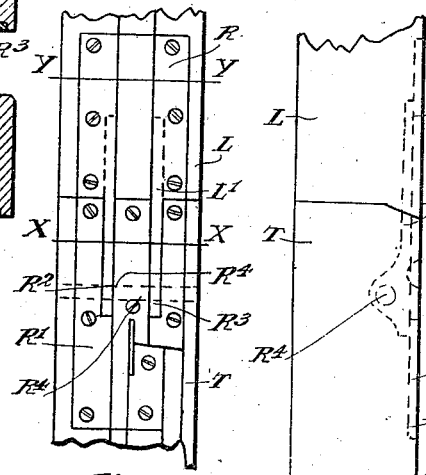
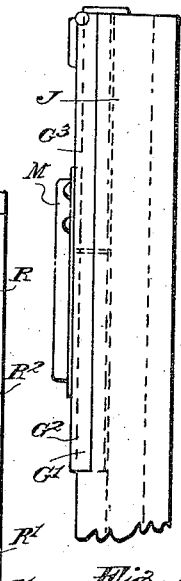
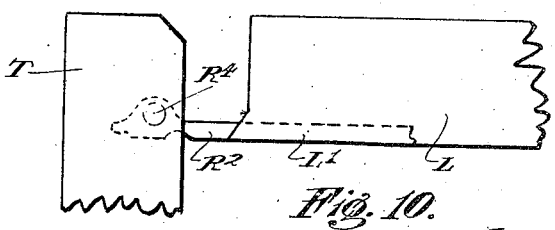

A. G. MACDONALD.
MOTOR CAR BODY.
APPLICATION FILED JUNE 3, 1913.
1,147,333.
Patented July 20, 1915.
4 SHEETS—SHEET 3.
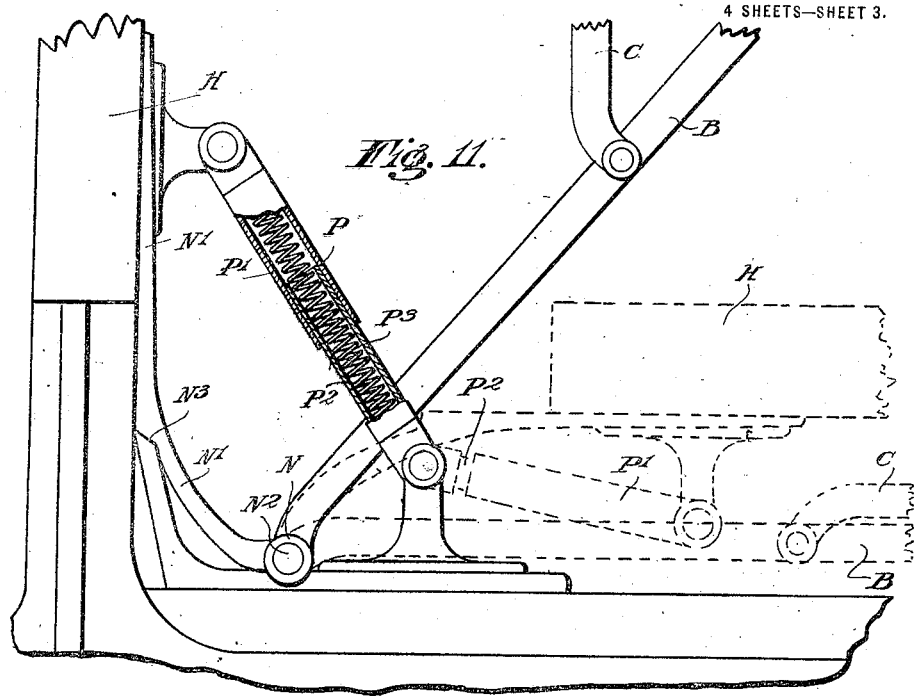
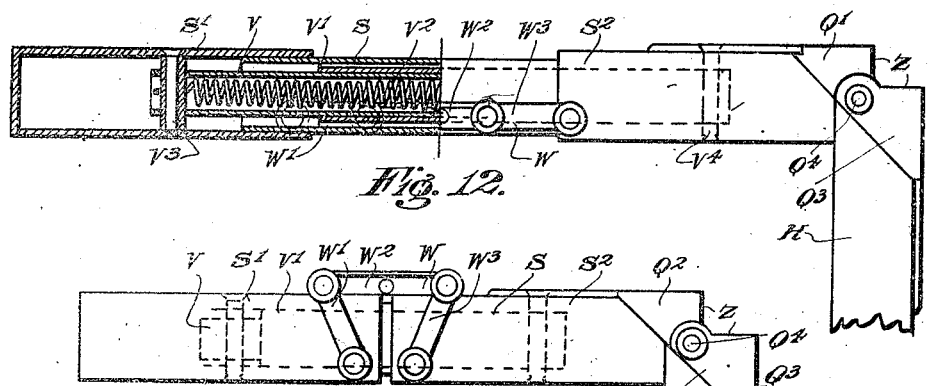
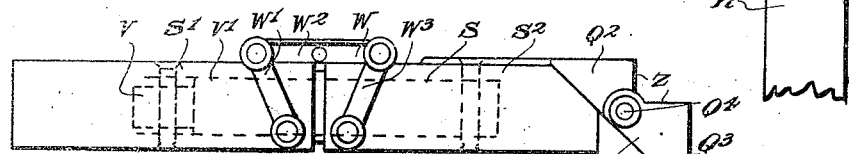
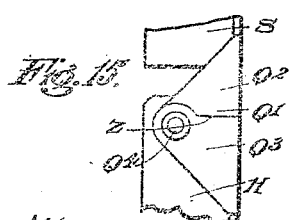
Witnesses:
H. N. Ramsey
C. A. Kn[...]
Inventor:
Alexander Godfrey Macdonald,
by [...] Attys

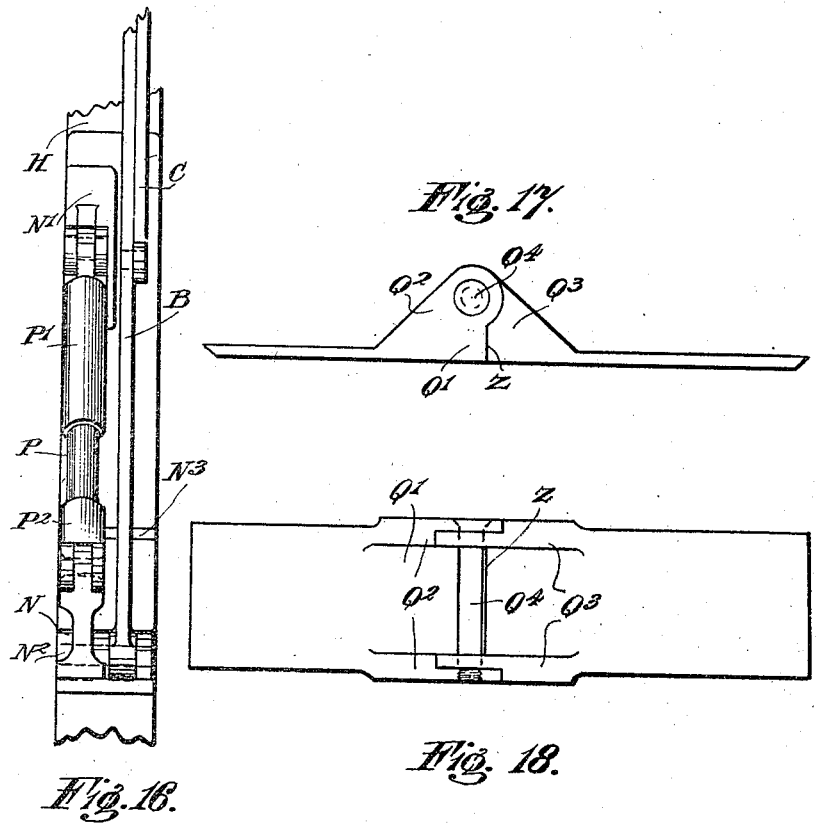
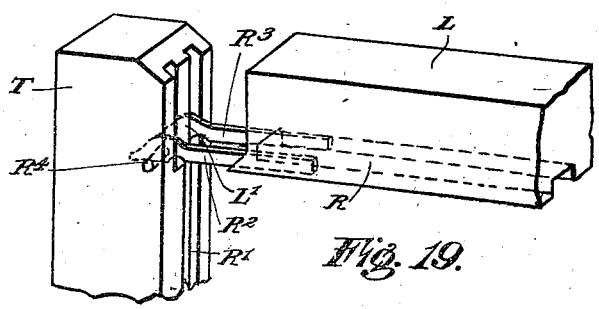

UNITED STATES PATENT OFFICE.

ALEXANDER GODFREY MACDONALD, OF TETBURY, ENGLAND.

MOTOR-CAR BODY.

1,147,333.    Specification of Letters Patent.    Patented July 20, 1915.

Application filed June 3, 1913. Serial No. 771,396.

*To all whom it may concern:*

Be it known that I, ALEXANDER GODFREY MACDONALD, a subject of the King of Great Britain, and a resident of Tetbury, Gloucestershire, England, have invented new and useful Improvements in or Relating to Motor-Car Bodies, of which the following is the specification.

This invention relates to improvements in or connected with motor car bodies, and particularly to motor car bodies provided with a folding hood.

I provide a body and cover therefor which by a special construction of the parts constituting the body and hood or cover of same, the said body may be rapidly converted from a completely closed body to a completely open one without leaving upstanding therefrom any portion of the framing or pillars, and I provide certain improvements in the said parts of the said body rendering the said complete closure of the cover or hood and its complete opening more convenient and effective in operation.

In order that my invention may be completely understood reference should be made to the accompanying sheets of drawings, in which:—

Figure 1 is a side elevation showing the body with the said improvements, the body being completely closed, but with the hood or cover in section. Fig. 2 is a side elevation showing the body completely open with the cover in section. Fig. 3 shows in detail one of the metal channels or bars connecting the tops of the upright members when the hood is in the closed position. Fig. 4 shows the said channel in the folded position against a pillar. Fig. 5 is a section of this channel to a larger scale. Fig. 6 shows in detail the construction of the joint or hinge of the second pillar. Figs. 7 and 8 are sections of the said pillar on the lines X X and Y Y of Fig. 6, respectively. Fig. 9 is a side elevation of the hinge showing the pillar in the "up" or vertical position. Fig. 10 is a similar view showing the pillar in the horizontal position. Fig. 11 shows in detail the construction of the hinge of the back pillar with the spring attachment in section, the dotted lines showing the pillar in the "down" position. Fig. 12 is a detail, part section, of the telescopic tubes connecting the back pillars in the extended position. Fig. 13 is an elevation of the said tubes in the closed or shortened position. Fig. 14 is a section of the tubes. Fig. 15 shows the hinge and joint connecting the said tubes with the pillar. Fig. 16 is an end view of the spring controlled hinge shown in elevation Fig. 11, at the foot of the back pillar. Fig. 17 shows in detail the metallic hinge shown in Figs. 12, 13 and 15. Fig. 18 is a plan of same. Fig. 19 is a perspective view of the hinge shown in Fig. 6, in the down or horizontal position.

Referring to Figs. 1 and 2, A is the hood or cover extending from front to back of the body. B is the first hinged member of the back portion of the frame. The member B has pivoted on it a second member C. D is the third member secured to the pillar H. The metal frame members $B^1$ of the outside of the hood or cover are like the pillars B, C, D, of usual construction. The transverse members E, F, G, are connected or secured to, when the cover is in the closed position, as in Fig. 1, the pillars L and J, and the wind screen K, respectively.

On referring to Fig. 2, the position taken by the pillars J and H, and the transverse top members when the body is completely open is made clear, the pillar L closes down completely. The wind screen K and the pillars J and L are connected together at the top by the telescopic or sliding tubes or channels $G^1$ $F^1$ which are hinged on each side of the pillar J, and are attached to the other members L and K by spring catches of the usual construction (not shown). These tubes or channels $G^1$ $F^1$ are adapted to be folded down flat against the pillar J, and are of such section as to allow the inner flange U to fit within the usual window channel of the said pillar. The said tubes or channels are telescopic comprising the two sectional forms $G^2$, $G^3$, $G^2$ being the outer inclosing the inner channel $G^3$, the smaller tube $G^3$ being adapted to slide within the other as shown in Fig. 3, and in section in Fig. 5. Suitably secured to each sliding portion is the spiral spring $G^4$. This spring when the hood is closed is extended and the two telescopic tubes or channels $G^2$ $G^3$ slide out and lengthen to the required distance at the same time placing the spring under tension. When the hood is open and the tubes or channels are released, the spiral spring $G^4$ takes its normal unextended position as in Fig. 4, and thereby causes the sliding tubes or channels to close together enabling the connecting member thus shortened to be folded against the pillar J. The cap or cover M inclosing the spring G⁴ is secured to one portion of the channel, the other end being free to slide. On referring to the section of this channel shown in Fig. 5, the position of the window frame I shown in dotted lines is made clear, the said frame resting against the inside flange U of the outer tube or channel prevents wind or rain penetrating to the interior of the body. The upright pillars J, L, and H, do not depend for support in their vertical position on their attachment to the hood so that they might if desired be retained in a vertical position when the hood is folded back. Without closing the hood therefore when the windows at each side are drawn up a more complete wind screen is provided, and full protection from wind is given the passengers.

Referring to Figs. 6 to 10, the upright pillar L on each side, is secured to the side post or member T by means of the hinge L¹, and is adapted to fold inwardly across the body as shown in Figs. 10 and 19.

Referring to Fig. 6, R and R¹ are the two plates of the hinges screwed to the members L and T respectively and having the fork or double arms R² and R³ connecting the two hinge plates secured in the posts T by the pin or bolt R⁴. Figs. 9 and 10 show this hinge in dotted elevation in the upright and horizontal positions respectively.

With reference to Figs. 11 and 16, the pillar H is secured rigidly in any suitable manner to the top hinge plate or leaf N¹ of the hinge N which has its pivot N² and an abutment stop or shoulder N³ which prevents the pillar H becoming loose and serves to steady same. Secured to each leaf plate of the hinge is the steel barrel or tube P having two telescopic or sliding portions P P², the inner, P², being adapted to slide in the outer P¹, and within these is situated the spiral spring P³. The said spring is always under compression and therefore tends to thrust the two portions of the hinge apart and thus hold the pillar H in the vertical position. When the said pillar is folded down, the spring is compressed until the end attached to the pillar falls below the other end secured to the body, when the spring is again released thus locking the head in the down position as indicated by dotted lines in Fig. 11. This construction renders the framework perfectly rigid when the body is closed and counterbalances to an extent the weight of the hood and framework, thus rendering it easier to manipulate when it is desired to close the body.

Figs. 12 and 13, show the construction of the horizontal telescopic member S connecting the pillars H and L, see Fig. 1. The said telescopic member S comprises two sliding portions S¹, S², which are adapted to telescope each other. Within the said tubes are the sliding telescopic tubes V and V¹ inclosing the spiral spring V². The spring is secured at one end to the pin V³ in the portion S¹, the other end is secured to the pin V⁴ in the portion or tube S². Figs. 12 and 13 show the said member in the extended and contracted or shortened position respectively. In order to keep the spring V² extended and to prevent undue strain upon the other members, I provide a stop joint W, consisting of links W¹, W², W³, which joint holds the two sections of the said telescopic member apart, and in the extended position, affording rigid construction. When it is desired to fold back the hood, this joint when the links are folded on their pins, releases the spring V² and the member by the tension of the spring shortens to the length required. The said member thus shortened will when the pillar H is folded back, see Fig. 2, cause the overhang of the hood at the back of the car to be decreased, so causing the hood or cover and framing to fold back flat and occupy less space. The said telescopic cantrail or horizontal top member S is jointed to the pillar H, by means of the hinge Q¹ shown in Figs. 15, 17 and 18. The said hinge is constructed of two leaves or portions Q², Q³, a stud or pin Q⁴ passes through the pillar H, see Figs. 12 and 15. The stop or shoulder Z, Figs. 15 and 17, on each side of the hood or cover provides a better support for the weight thereof when the cover is down, and avoids undue strain upon the center pin or pivot Q⁴, as is the case when ordinary hinges are used for this purpose.

I am aware that spring jointed telescopic tubes have been employed before in motor car hoods to assist in lifting the hood and also to hold it down when completely open.

What I do claim as my invention and desire to secure by Letters Patent is:—

1. In a vehicle body structure, the combination with pillar members, of extensible cant rails, each comprising tubular telescoping members and means yieldably connecting the telescoping members together.

2. In a vehicle body structure, the combination with pillar members, of extensible cant rails to connect the pillar members, each cant rail comprising tubular telescoping members, and a coiled spring at the interior of the members yieldably connecting the same together.

3. A vehicle body structure including a folding pillar member having a groove in one side thereof and an extensible cant-rail pivotally connected to the folding pillar member at the upper portion thereof, said cant-rails comprising telescoping members, and means yieldably connecting the telescoping members together, the cant-rails when telescoped being adapted to fold down within the groove of the pillar member.

4. In a vehicle body structure, the combination with pillar members, of extensible cant-rails to connect the pillar members, each cant-rail comprising members constructed and arranged to slide upon each other, means yieldably connecting the members together, and means for maintaining the members in extended or open position.

5. In a vehicle body structure, the combination with pillar members, of extensible cant-rails to connect the pillar members, each cant-rail comprising members constructed and arranged to slide upon each other, means yieldably connecting the members together, and a knuckle connected with the members and adapted to maintain the same in extended position.

6. In a vehicle body structure, the combination with pillar members, of extensible cant-rails to connect the pillar members, each cant-rail comprising members constructed and arranged to slide upon each other, means yieldably connecting the members together, and a knuckle connected with the members and adapted to maintain the same in extended position, said knuckle comprising a pair of link members each connected at one end with one of the telescoping members, and an intermediate link member connecting the first mentioned link members.

7. In a body structure for vehicles, the combination with pillar members, of extensible cant-rails to connect the pillar members, each cant-rail comprising telescoping members, a coiled spring yieldably connecting the members together, and a telescoping housing for the spring connected at opposite ends to the said telescoping members.

8. In a body structure for vehicles, the combination with pillar members, of extensible cant-rails to connect the pillar members, each of the cant-rails comprising tubular telescoping members, a coiled spring yieldably connecting the members together, and a telescoping housing for the spring at the interior of the tubular members.

9. In a body structure for vehicles, the combination with pillar members, of extensible cant-rails to connect the pillar members, each of the cant-rails comprising telescoping members, a coiled spring yieldably connecting the members together, and a housing for the spring, said housing including a tubular member connected at one end to one of the said members.

ALEXANDER GODFREY MACDONALD.

Witnesses:
 E. TYLER,
 E. J. FUSSELL.